(12) United States Patent
Lee

(10) Patent No.: US 8,134,296 B2
(45) Date of Patent: Mar. 13, 2012

(54) REGULATING CIRCUITRY FOR AUTOMOBILE LIGHT SYSTEMS

(76) Inventor: Chia Chun Lee, Sihhu Township (TW)

( * ) Notice: Subject to any disclaimer, the term of this patent is extended or adjusted under 35 U.S.C. 154(b) by 655 days.

(21) Appl. No.: 12/271,909

(22) Filed: Nov. 16, 2008

(65) Prior Publication Data
US 2010/0102727 A1    Apr. 29, 2010

Related U.S. Application Data

(60) Provisional application No. 61/108,872, filed on Oct. 28, 2008.

(51) Int. Cl.
*B60Q 7/00* (2006.01)
*B60Q 1/26* (2006.01)
(52) U.S. Cl. ............................. 315/82; 315/77
(58) Field of Classification Search .............. 315/76–78, 315/80, 82, 291, 307, 224
See application file for complete search history.

(56) References Cited

U.S. PATENT DOCUMENTS

| | | | |
|---|---|---|---|
| 5,677,205 A * | 10/1997 | Williams et al. | 438/237 |
| 5,943,200 A | 8/1999 | He | |
| 6,348,818 B1 | 2/2002 | Filipovski | |
| 6,548,993 B1 | 4/2003 | Rutyna et al. | |
| 6,693,390 B2 * | 2/2004 | Tamai et al. | 315/172 |
| 6,747,422 B2 * | 6/2004 | Yamamoto et al. | 315/307 |
| 6,989,635 B2 * | 1/2006 | Iwaki et al. | 315/82 |
| 7,402,960 B2 * | 7/2008 | Kajita | 315/291 |
| 7,446,488 B1 * | 11/2008 | Cross et al. | 315/308 |
| 7,538,534 B2 * | 5/2009 | Mednik et al. | 323/285 |
| 7,750,616 B2 * | 7/2010 | Liu | 323/285 |

* cited by examiner

*Primary Examiner* — Douglas W Owens
*Assistant Examiner* — Minh D A
(74) *Attorney, Agent, or Firm* — Alexander Chen, Esq.

(57) ABSTRACT

A regulating circuit for automobile light for outputting an elevated voltage to power an operation of a driving integrated circuit, comprises a first diode having its anode interconnected to an input of the power supply (forward biased) and interconnected to the first diode in serial (reverse biased) and then interconnected to a driving integrated circuit. The first diode is used to detect a maximum voltage input, and the second diode is used to restore its energy to the capacitor so as to keep the voltage output maintained in an elevated level. As a result, the regulating circuit can be used with all kinds of driving integrated circuit incorporated in the automobile headlight.

10 Claims, 5 Drawing Sheets

REGULATING CIRCUITRY FOR AUTOMOBILE LIGHT SYSTEMS

CROSS-REFERENCE TO RELATED APPLICATIONS

This application claims the benefit of priority under 35 U.S.C. 119(e) to the filing date of U.S. provisional patent application No. 61/108,872 entitled "Regulating Circuitry For Automobile light systems" which was filed Oct. 28, 2008, and is incorporated herein by reference.

FIELD OF THE INVENTION

The present invention relates to a regulating circuit, and more particularly to a regulating circuit incorporating two diodes interconnected and arranged in reverse biased so as to maintaining supplied voltage in an elevated state thereby providing an applicable power supply to various automobile headlights systems and their integrated circuits (IC) thereof.

DESCRIPTION OF PRIOR ART

The headlight of an automobile has been evolved from traditional electrical filament into a light-emitting-diode (LED)-clusters or modules in which a plurality of LED modules are arranged together so as to emit and cast sufficient illumination. As a result, how to effectively drive these LED modules becomes a main theme of improvements for various manufacturers in the filed of automobile lights.

FIG. 4 is a block diagram of a conventional integrated circuitry used to drive the LED modules. This conventional IC is provided with a voltage input (Vin) of 40 Volts and a voltage output (Vout) of 60 Volts where it contains light intensity modulation capabilities of common topologies including Buck (voltage step down converter), Boost (voltage step up converter), or Buck-Boost (voltage step up and step down) as in current mode PWM (pulse width modulation) regulator for LED driving applications for automobile lights.

However, when the voltage input (Vin) involves a pulse voltage, the above-described PWM regulator will not be able to function properly. For example, in a step up mode (Boost), the PWM regulator steps up the voltage of the Vin to provide elevated voltage to the LED module. One unique aspect of this step up feature is that the Vin must be lower than that of the voltage output for the Boost topology of a PWM regulator to function properly. Where Vin involves a pulse voltage, the range of Vin can be greater than that of the voltage output prescribed by the Boost topology and thereby preventing the PWM regulator to function properly and thus unable to drive the LED module. In this respect, the application of a typical PWM regulator in the context of vehicle light application for LEDs is severely limited when encountering Vin that involves pulse voltage.

OBJECT OF THE INVENTION

It is an object of the present invention to provide a regulating circuit for use with an automobile light system such that when voltage input (Vin) involves pulse voltage, the Vin voltage can be regulated to an elevated current mode thereby meeting various automobile light systems' driving circuit's power demand. Incidentally, there is a wide application for this current invention. In particular, an extremely useful application is when automobile headlight manufacturer provides replacement headlight system that requires the power supply to be in elevated current instead of being pulse voltage. This is especially true because there is a emerging trend to add LED (light emitting diodes) lights in the headlights system and that the driving IC for the LED lights requires Power supply in an elevated current mode instead of pulse voltage mode.

SUMMARY OF THE INVENTION

In order to achieve the object set forth, a regulating circuit made in accordance with the present invention, which is electrically interconnected to a voltage input and a voltage output of a power supply so as to output an elevated voltage to power an operation of an integrated circuit, comprises a first diode having its anode interconnected to an input of the power supply (forward biased), and interconnected to an integrated circuit. A second diode has its cathode interconnected to the first diode in serial (reverse biased), and is interconnected to the integrated circuit.

The first diode is used to prevent the feed back of the voltage from overflowing to the input, and the second diode is used to restore its energy so as to keep the voltage output maintained in an elevated level. As a result, the regulating circuit can be used with all kinds of driving integral circuit incorporated in the automobile light systems.

The first diode is used to prevent the feed back of the voltage from overflowing to the input, (Vin), and the second diode is used to restore energy from voltage out (Vout) into the capacitor, thereby maintaining the voltage from the Vin at an elevated current mode. In this respect, the embodiment provides a regulating circuit that is capable of converting any automobile light system which employs pulse voltage for voltage input where the pulse voltage is converted to an elevated current mode. Such invention would provide a viable solution for the automobile lighting industry aiming to reduce time and costs in developing new lighting applications.

The method to which the second diode restores energy from voltage output (Vout) to the capacitor is as follows: The regulating circuit as described above includes a grounded capacitor interconnected to the first diode so as to have the second diode to restore the outputted voltage from the power supply to the grounded capacitor.

The other feature of the present invention is that when the integrated circuit is a (PWM) pulse-width-modulation integrated circuit, it is not functional when the power supply involves a pulse voltage. However, by applying the present invention, when the pulse voltage is supplied, the regulating circuit made according to the present invention can convert the pulse voltage into an elevated voltage output so as to power the operation of the PWM integrated circuit. As a result, the PWM integrated circuit can be widely applied in various automobile light systems that require the use of the PWM IC to power LED module.

The first and second diode used in the present invention can be replaced with any switching device according to the requirements of the diodes which allow an electric current to pass in one direction and blocks the current in the opposite direction. For example, a transistor or a field effect transistor (FET) can be used to replace the first and second diode. That is to say the first diode can be replaced by one of the transistor and the field effect transistor (FET); while the second diode can be also replaced with one of the transistor and field effect transistor (FET). An example, of the FET can be a metal-oxide-semiconductor field-effect transistor (MOSFET).

BRIEF DESCRIPTION OF THE DRAWINGS

The features of this invention which are believed to be novel are set forth with particularity in the appended claims.

The invention, together with its objects and the advantages thereof, may be best understood by reference to the following description taken in conjunction with the accompanying drawings, in which like reference numerals identify like elements in the figures and in which.

DETAILED DESCRIPTION OF THE INVENTION

Figure 1:
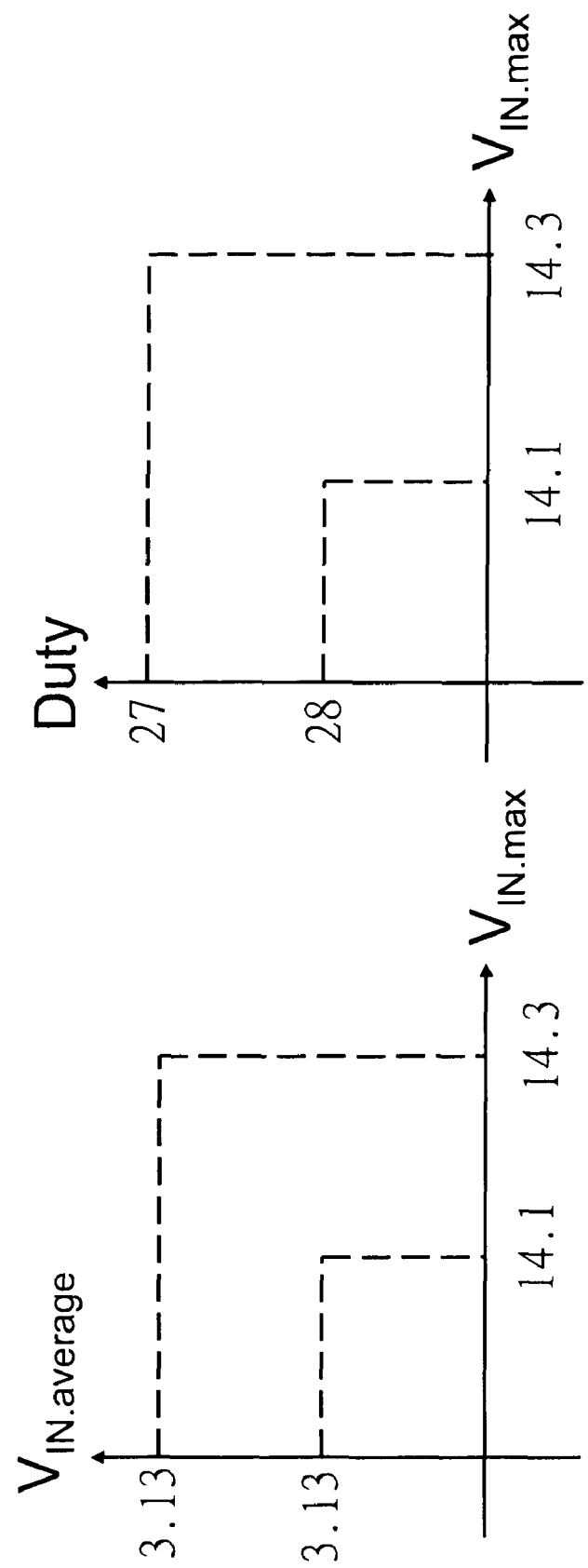
FIG. 1 is a characteristic chart of voltage of a vehicle operation system of a BMW automobile.
Figure 2:
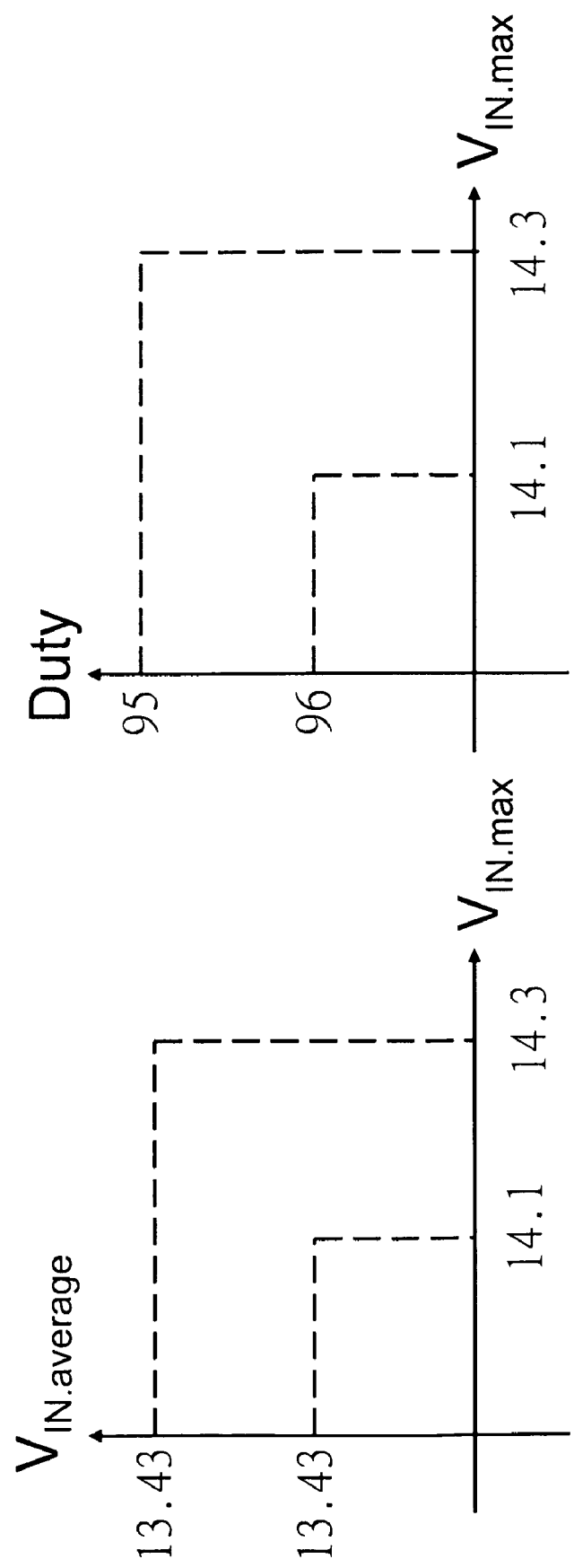
FIG. 2 is a characteristic chart of voltage of a braking system of a BMW automobile

FIGS. 1 and 2 represent the characteristic chart of voltage of a vehicle operation system a BMW automobile and a characteristic chart voltage of a braking system a BMW automobile, respectively, and it can be readily recognized that when a pulse voltage is used as an voltage input, the driving integrated circuit will not function properly. In that respect, the LED headlight can not be lit up.

Figure 3:
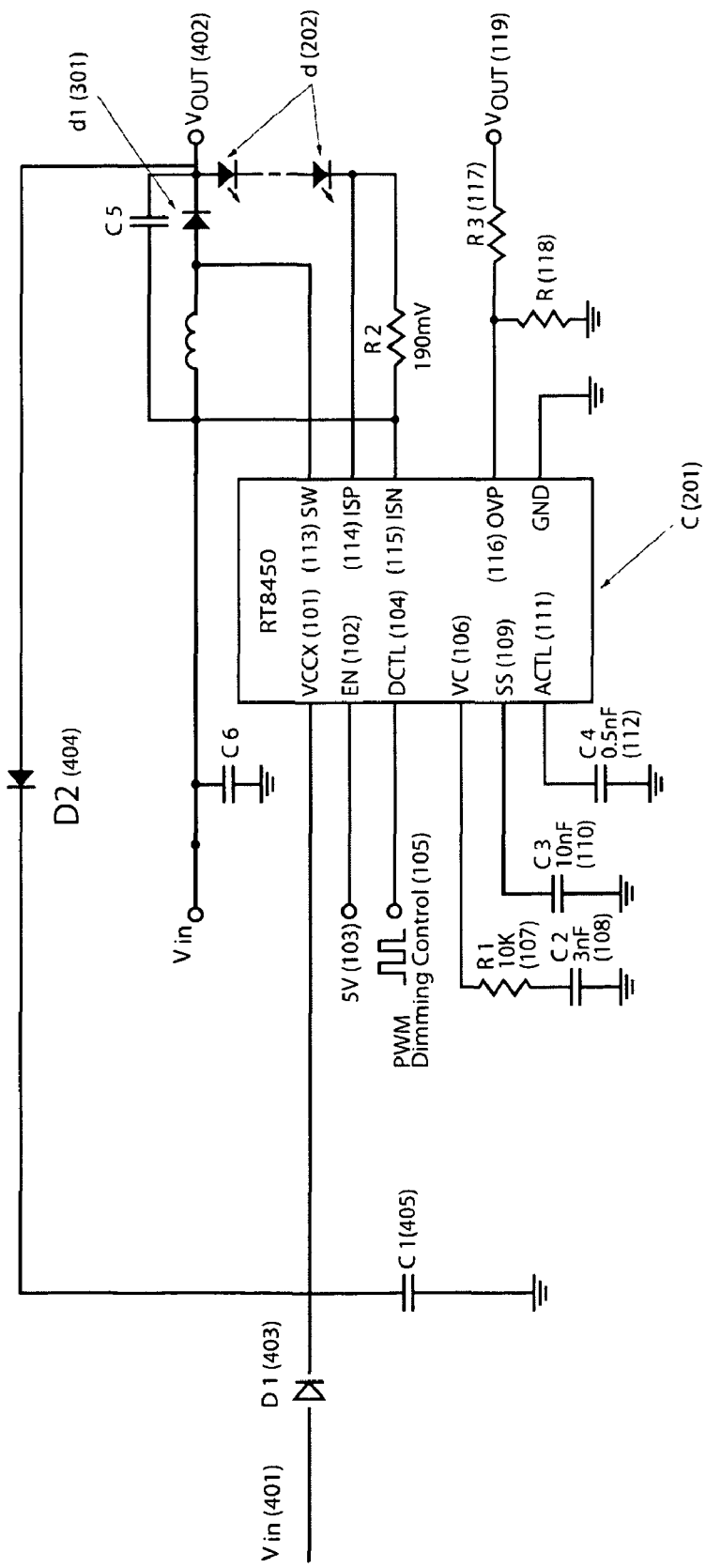
FIG. 3 is a schematic of an automobile headlight system incorporating a regulating circuit made in accordance to the present invention.
Figure 4:
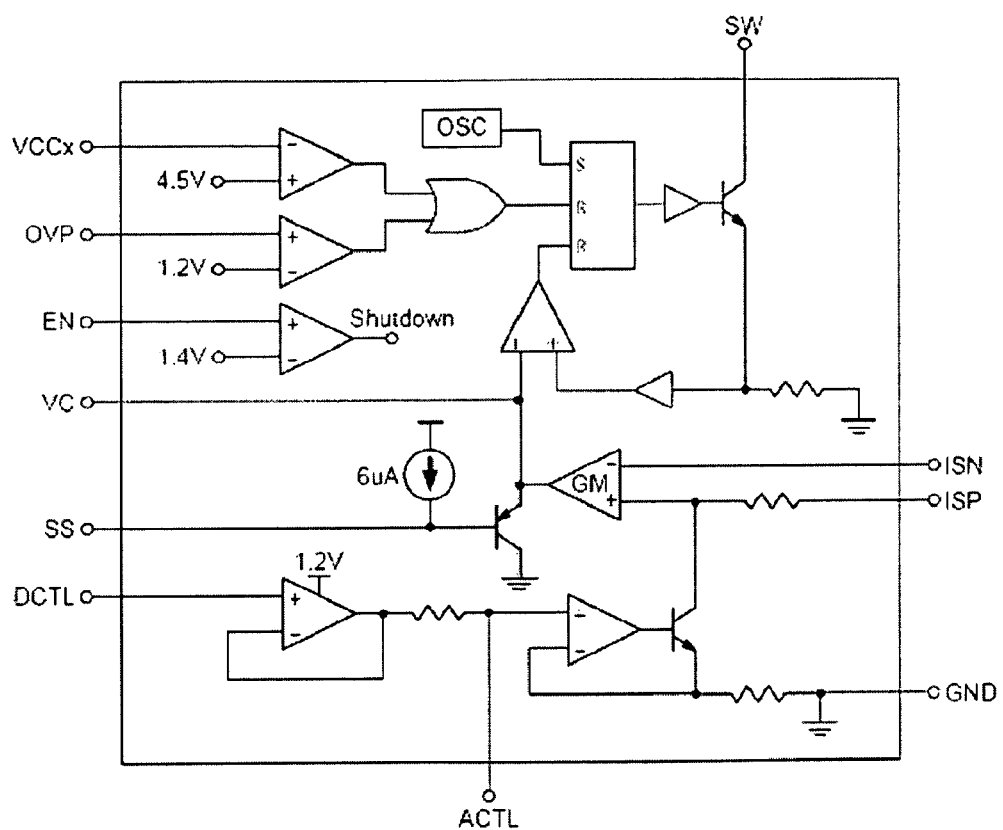
FIG. 4 is a functional block diagram of a PWM integrated circuit used to power a LED headlight.

In a preferred embodiment, the regulating circuit made according to the present invention can be implemented and incorporated into the light circuit of the BMW automobile, such as illustrated in FIG. 3. Specifically, the regulating circuit is used to regulate pulse voltage supplied in an automobile lighting system where specifically the automobile driving circuit incorporates a PWM current mode regulator (driving integrated circuit). The regulating circuit comprises an voltage input (Vin), an voltage output(Vout), a driving integrated circuit (c), and a LED module (d).

As according to FIG. 1 and FIG. 2 which incorporates the light system of the driving system and the braking system of a BMW vehicle, the driver integrated circuit (c) is a PWM integrated circuit and such PWM integrated circuit is commercially available as RT8450, RT 8451 and TR8452 made by Richtek company of Taiwan.

An example of the present invention is disclosed in FIG. 3. Specifically in FIG. 3, the Vccx 101 end of the PWM IC 201 is connected to the regulating circuit of the present invention. Within the figure, the EN 102 end is connected to a 5 volt power supply 103 to power the PWM IC. The DCTL 104 end is interconnected to PWM dimming control circuit 105 used to adjust the light intensity of the LED 202. The VC 106 end is interconnected to the R1 resistor 107 wherein the other end of the R1 resistor is interconnected to a C2 108 grounded capacitor. The SS 109 end is interconnected to a C3 110 grounded capacitor and the ACTL end 111 is interconnected to C4 capacitor 112. In FIG. 3, SW 113, ISP 114, ISN 115 ends are interconnected to the LEDs (d) 202 and can drive LED modules. And OVP 116 end is interconnected with R3 117 and R4 118 serial resistors where R3 117 resistor is interconnected to voltage out (Vout) 402 and the R4 resistor's 118 other end is grounded.

The LED modules (d) 202 is comprised of serially connected d1 diode modules 301 where d1's 301 P side or anode is connected to the driver IC's (c) 201 SW 113 end. Through the utilization of d1 301, the power is transferred to LED modules (d) 202. For the last of the serially connected LED module (d) 202, it's n-side is connected to the driver IC (c)'s 201 ISP 114 end.

In a preferred embodiment, the automobile light system incorporating regulating circuit which regulates pulse wave voltage and is connected to the voltage input (Vin) 401 and voltage output (Vout) 402 and also converts pulse wave voltage to elevated voltage for power to the driver IC (c) 201 and it is comprised of the following: 1. a first diode (D1) 403 where its P end is connected to the supply of the of the voltage, 2. where its N side is connected to the diver IC's 201 Vccx 101 end.

The second diode (D2) 404 where its cathode is connected to the first diode (D1) 403's anode and the second diode (D2)'s 404 anode is further connected to the voltage out 402.

Capacitor (C1) 405 is connected to the first diode (D1)'s 403 cathode. Where the circuit is activated, voltage input (a) 401 provides pulse wave voltage, where the first diode (D1) 403 detects voltage input (a) 401 of its maximum voltage input, the driver IC 201 achieves driving voltage, causing the voltage output to be at an elevated stage, thereafter the driver IC (c) 201 elevates voltage rapidly, thereby supplying voltage out to the second diode (D2) 404. Here, the first diode (D1) 403, because of the second diode (D2)'s 404 cathode is at an low level, it is in a state of short circuit, thereby the voltage input (a)'s 401 voltage is at elevated state, and when the first diode (D1) 403 detects that voltage input (a) 401 is at its maximum state, at this point the capacitor C1 405 transfers power to the voltage maximum value, and cause to activate driver IC (c) 201 for it to act as PWM regulator.

Figure 5:
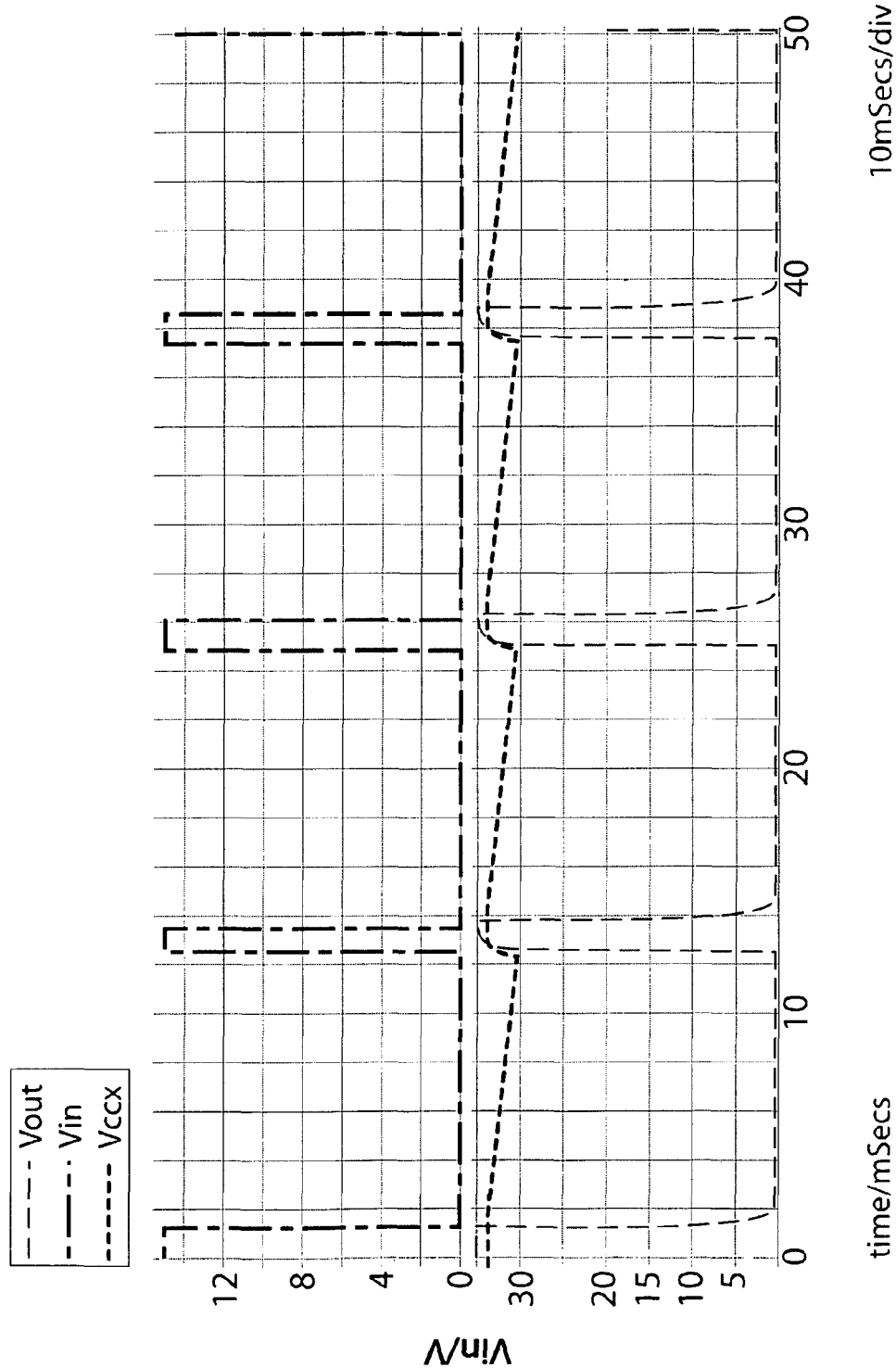
FIG. 5 is a pulse wave voltage diagram incorporated with the regulating circuit made in accordance with the present invention.

As shown in FIG. 5, Vin represents the voltage wave form at the voltage input (a), and Vout represents the voltage wave form at the voltage output of the regulating circuit. Both are pulse voltages. Vccx, on the other hand, through the present invention's regulating circuit converts the pulse voltage to an elevated voltage output and it's effectiveness is apparent on the chart. Apparently, the regulating circuit of the present invention can effectively convert the pulse voltage into an elevated voltage output such that the PWM integral circuit, available from Richtek RT8450, can properly function. As a result, it can be widely used in the headlight system that utilizes pulse voltage for power supply to drive IC that requires elevated voltage input.

In summary, the regulating circuit made according to the present invention can readily output the elevated voltage so as to drive a variety of driving circuits. In addition, the regulating circuit made according to the present invention features cost-effective in view of its simplified configuration. On the other hand, the first and second diodes (1, 2) can be readily replaced with any switching device in light of the characteristic of circuit, such as a transistor or a field-effect transistor, while it can still satisfy its intended purposes and incorporated into a variety of headlight system. It is indeed a great invention which can be applied to the industry.

I claim:

1. An automobile headlight regulating circuit capable of converting pulse wave voltage to an elevated current mode comprising of:
   a. a first one directional diode having its anode interconnected to a voltage input from a power supply and said first diode's cathode interconnected to a driving integrated circuit wherein said driving integrated circuit is a pulse-width-modulation integrated circuit; and
   b. a second one directional diode having its cathode interconnected to said first diode and its anode interconnected to a voltage output wherein said voltage output is interconnected to said driving integrated circuit;
   c. a capacitor interconnected to said first diode's cathode and to said second diode's cathode;

d. wherein once said voltage input provides pulse wave voltage to said driving integrated circuit through said first diode said driving integrated circuit then achieves driving voltage thereby causing said voltage output to be at an elevated stage thereby and supplies said pulse wave voltage out to said second diode;

e. wherein said second diode guides said pulse wave voltage to said capacitor for storage as stored voltage;

f. wherein said capacitor later supplies said stored voltage to said driving integrated circuit when said driving integrated circuit is not receiving pulse wave voltage from said power supply.

2. The automobile headlight regulating circuit for automobile headlight as recited in claim 1, wherein a cathode of the capacitor is grounded.

3. The automobile headlight regulating circuit for automobile headlight as recited in claim 1, wherein the first diode and second diode can be replaced with an electric switching device wherein said electric switching device allows an electric current to pass in one direction and blocks the current in the opposite direction.

4. The automobile headlight regulating circuit for automobile headlight as recited in claim 3, wherein said electric switching device is a field-effect transistor.

5. The automobile headlight regulating circuit for automobile headlight as recited in claim 4, wherein the field effect transistor is a metal-oxide-semiconductor field-effect transistor (MOSFET).

6. A method to convert pulse wave voltage to an elevated current mode for an automobile headlight regulating circuit comprising of the steps of:

a. utilizing a first one directional diode having its anode interconnected to a voltage input from a power supply and said first diode's cathode interconnected to a driving integrated circuit wherein said driving integrated circuit is a pulse-width-modulation integrated circuit; and b. further utilizig a second one directional diode having its cathode interconnected to said first diode and its anode interconnected to a voltage output wherein said voltage output is interconnected to said driving integrated circuit;

c. further utilizig a capacitor interconnected to said first diode's cathode and to said second diode's cathode;

d. wherein once said voltage input provides pulse wave voltage to said driving integrated circuit through said first diode said driving integrated circuit then achieves driving voltage thereby causing said voltage output to be at an elevated stage thereby and supplies said pulse wave voltage out to said second diode;

e. wherein said second diode guides said pulse wave voltage to said capacitor for storage as stored voltage;

f. wherein said capacitor later supplies said stored voltage to said driving integrated circuit when said driving integrated circuit is not receiving pulse wave voltage from said power supply.

7. The method of claim 6, wherein a cathode of the capacitor is grounded.

8. The method of claim 6, wherein the first diode and second diode can be replaced with an electric switching device wherein said electric switching device allows an electric current to pass in one direction and blocks the current in the opposite direction.

9. The method of claim 8, wherein the electric switching device is a field-effect transistor.

10. The method of claim 9, wherein the field-effect transistor is a metal-oxide-semiconductor field-effect transistor (MOSFET).

* * * * *